US012621366B2

(12) United States Patent
Shao et al.

(10) Patent No.: US 12,621,366 B2
(45) Date of Patent: May 5, 2026

(54) INTERNET OF THINGS (IOT) SYSTEMS AND METHODS FOR MANAGING SMART GAS-INTEGRATED DATA CENTER

(71) Applicant: CHENGDU QINCHUAN IOT TECHNOLOGY CO., LTD., Chengdu (CN)

(72) Inventors: Zehua Shao, Chengdu (CN); Yong Li, Chengdu (CN); Yuefei Wu, Chengdu (CN); Lei Zhang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 58 days.

(21) Appl. No.: 18/952,004

(22) Filed: Nov. 19, 2024

(65) Prior Publication Data

US 2025/0080613 A1      Mar. 6, 2025

(30) Foreign Application Priority Data

Oct. 30, 2024     (CN) .......................... 202411523632.6

(51) Int. Cl.
  *H04L 67/12*          (2022.01)
  *G06Q 50/26*          (2024.01)
  *H04L 67/60*          (2022.01)
(52) U.S. Cl.
  CPC ............. *H04L 67/12* (2013.01); *G06Q 50/26* (2013.01); *H04L 67/60* (2022.05)
(58) Field of Classification Search
  CPC .............. H04L 7/12; H04L 7/60; G06Q 50/26
  See application file for complete search history.

(56) References Cited

U.S. PATENT DOCUMENTS

2023/0117676 A1 *    4/2023   Shao .................. G05B 23/0283
                                                   702/184

FOREIGN PATENT DOCUMENTS

CN          207817496 U       9/2018
CN          111835873 B       1/2021
                 (Continued)

OTHER PUBLICATIONS

Shao, Zehua, Development Direction of Sensor Network Communication Technology for IoT Intelligent Gas Meter, Gas & Heat, 41(4): B31-B46, 2021.

(Continued)

*Primary Examiner* — Jonathan A Bui
(74) *Attorney, Agent, or Firm* — METIS IP LLC

(57)          ABSTRACT

The present disclosure provides an IoT system and a method for managing smart gas-integrated data center. The method includes obtaining comprehensive gas enterprise data through a smart gas company management platform; generating a tagging parameter based on the comprehensive gas enterprise data; generating target gas data based on the comprehensive gas enterprise data and the tagging parameter; storing the target gas data into a corresponding gas database, the gas database includes at least one of a basic information base, an operational database, a specialized database, a supervisory database, and a shared database; in response to receiving a data sharing request, retrieving, from at least one of the gas database, the target gas data, through a data switch, based on a data sharing priority and the estimated transmission time; and sending the target gas data satisfying a preset requirement to a gas user platform or a residential user platform to enable the gas user platform and the residential user platform to share data based on the target gas data.

14 Claims, 5 Drawing Sheets

200

(56) References Cited

FOREIGN PATENT DOCUMENTS

| CN | 109101539 | B | 7/2021 |
|----|-----------|---|--------|
| CN | 117829791 | A | 4/2024 |
| CN | 117952282 | A | 4/2024 |
| CN | 118365476 | A | 7/2024 |
| CN | 118569814 | A | 8/2024 |
| JP | 2005031820 | A | 2/2005 |
| JP | 3186743 | U | 10/2013 |
| WO | 2024138659 | A1 | 7/2024 |

OTHER PUBLICATIONS

Ren, Baohong, Safety detection and control of urban underground pipelines Smart operation technology, Ocean University of China Press, 2021, 12 pages.

* cited by examiner

100

200

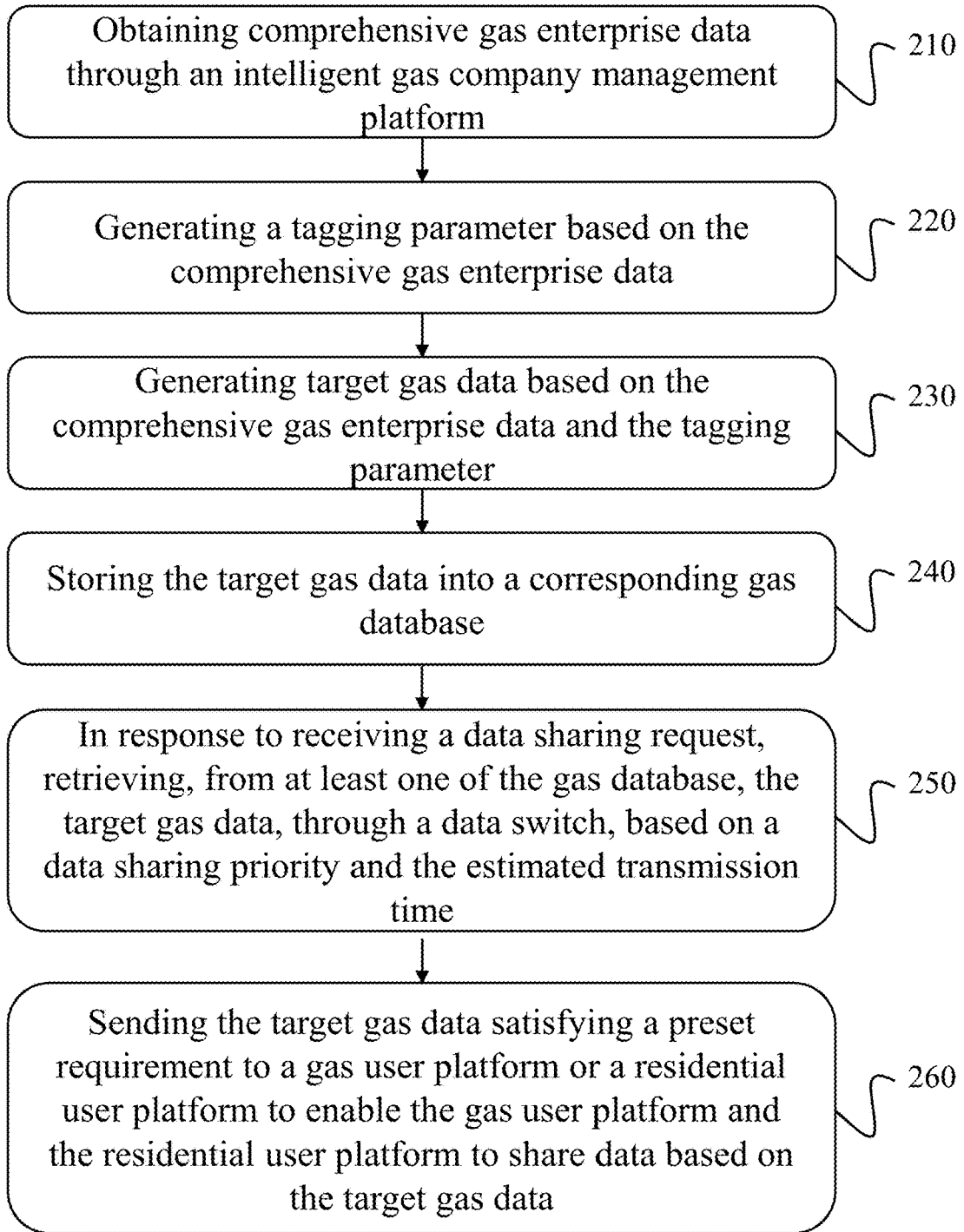

Obtaining comprehensive gas enterprise data through an intelligent gas company management platform ⌒ 210

Generating a tagging parameter based on the comprehensive gas enterprise data ⌒ 220

Generating target gas data based on the comprehensive gas enterprise data and the tagging parameter ⌒ 230

Storing the target gas data into a corresponding gas database ⌒ 240

In response to receiving a data sharing request, retrieving, from at least one of the gas database, the target gas data, through a data switch, based on a data sharing priority and the estimated transmission time ⌒ 250

Sending the target gas data satisfying a preset requirement to a gas user platform or a residential user platform to enable the gas user platform and the residential user platform to share data based on the target gas data ⌒ 260

FIG. 2

INTERNET OF THINGS (IOT) SYSTEMS AND METHODS FOR MANAGING SMART GAS-INTEGRATED DATA CENTER

CROSS-REFERENCE TO RELATED APPLICATIONS

This application claims priority to Chinese Patent Application No. 202411523632.6, filed on Oct. 30, 2024, the contents of each of which are hereby incorporated by reference.

TECHNICAL FIELD

The present disclosure generally relates to a field of gas data management, and in particular, relates to an Internet of Things (IoT) system and a method for managing smart gas-integrated data center.

BACKGROUND

A gas system is a commonly used indoor energy supply system, typically providing fuel for water heaters, stoves, and other appliances. The process of gas regulation generates a large amount of gas-related data, which requires the establishment of different databases to satisfy purposes of data processing, storage, retrieval, and data sharing, etc. The importance of different data is different, and the priority of the different data is different, which in turn leads to different updating cycles for the corresponding databases. Therefore, when data sharing is required (e.g., an information exchange between a gas user and a gas company), a real-time accuracy and reliability of data sharing between different databases often may not be guaranteed.

Therefore, it is desired to provide an IoT system and a method for managing smart gas-integrated data center that may effectively manage a large amount of gas-related data generated in a process of gas supervision, ensuring real-time and accurate data processing.

SUMMARY

One or more embodiments of the present disclosure may provide an Internet of Things (IoT) system and a method for managing smart gas-integrated data center.

One or more embodiments of the present disclosure provide a method for managing a smart gas-integrated data center. The method includes: obtaining comprehensive gas enterprise data through a smart gas company management platform; generating a tagging parameter based on the comprehensive gas enterprise data; generating target gas data based on the comprehensive gas enterprise data and the tagging parameter; storing the target gas data into a corresponding gas database, the gas database may include at least one of a basic information base, an operational database, a specialized database, a supervisory database, and a shared database; in response to receiving a data sharing request, retrieving, from at least one of the gas database, the target gas data, through a data switch, based on a data sharing priority and the estimated transmission time; and sending the target gas data satisfying a preset requirement to a gas user platform or a residential user platform to enable the gas user platform and the residential user platform to share data based on the target gas data.

One or more embodiments of the present disclosure provide an Internet of Things (IoT) system for government gas regulation, the LOT system includes a residential user platform, a smart gas government regulatory service platform, a smart gas government regulatory management platform, a smart gas government regulatory sensor network platform, a gas user platform, a gas user service platform, a smart gas government supervision object platform, a smart gas company sensor network platform, a gas user object platform, and a smart gas equipment object platform. The residential user platform may be configured to share data with the gas user platform based on target gas data. The smart gas government regulatory service platform may include multiple groups of routers and may be configured to interact with the residential user platform and the smart gas government regulatory management platform for data exchange. The smart gas government regulatory management platform may be configured with a gas-integrated data center and a data switch; the gas-integrated data center may include a plurality of gas databases. The data switch may be configured to determine, based on a data sharing priority, a data exchange order of the target gas data, and adjust a data transmission bandwidth of each of the different ports based on the data exchange order. The smart gas government regulatory management platform may be configured to: generate a tagging parameter based on comprehensive gas enterprise data; generate the target gas data based on the comprehensive gas enterprise data and the tagging parameter, and store the gas target data into the corresponding gas database, respectively; in response to receiving a data sharing request from at least one of the residential user platform and the gas user platform, through the data switch, retrieve the gas target data from at least one of the gas databases according to the data sharing priority and an estimated transmission time; and send the gas target data satisfying a preset requirement to at least one of the gas user platform and the residential user platform. The smart gas government regulatory sensor network platform may be configured to interact with the smart gas government regulatory management platform and the smart gas government supervision object platform for data exchange. The gas user service platform may include multiple groups of routers and may be configured to interact with the gas user platform and the smart gas government supervision object platform for data exchange. The smart gas government supervision object platform may be configured to obtain comprehensive gas enterprise data. The smart gas company sensor network platform may be configured to communicate and connect the smart gas government supervision object platform with the gas user object platform and the smart gas equipment object platform, respectively, as configured by different gas companies. The gas user object platform may be configured on an enterprise communication terminal, and the smart gas equipment object platform may be configured on a gas monitoring device contained in gas production facilities. For each group of the multiple groups of routers, the group of routers may be configured to determine the data sharing priority based on a request time of the data sharing request and a router core degree, and send the data sharing priority and the data sharing request to the smart gas government regulatory management platform.

One or more embodiments of the present disclosure provide a computer-readable storage medium, the storage medium stores computer instructions, and the computer performs a method for managing a smart gas-integrated data center after the computer reads the computer instructions in the storage medium.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 2 is a flowchart of an exemplary process for managing a smart gas-integrated data center according to some embodiments of the present disclosure;

DETAILED DESCRIPTION

Figure 1:
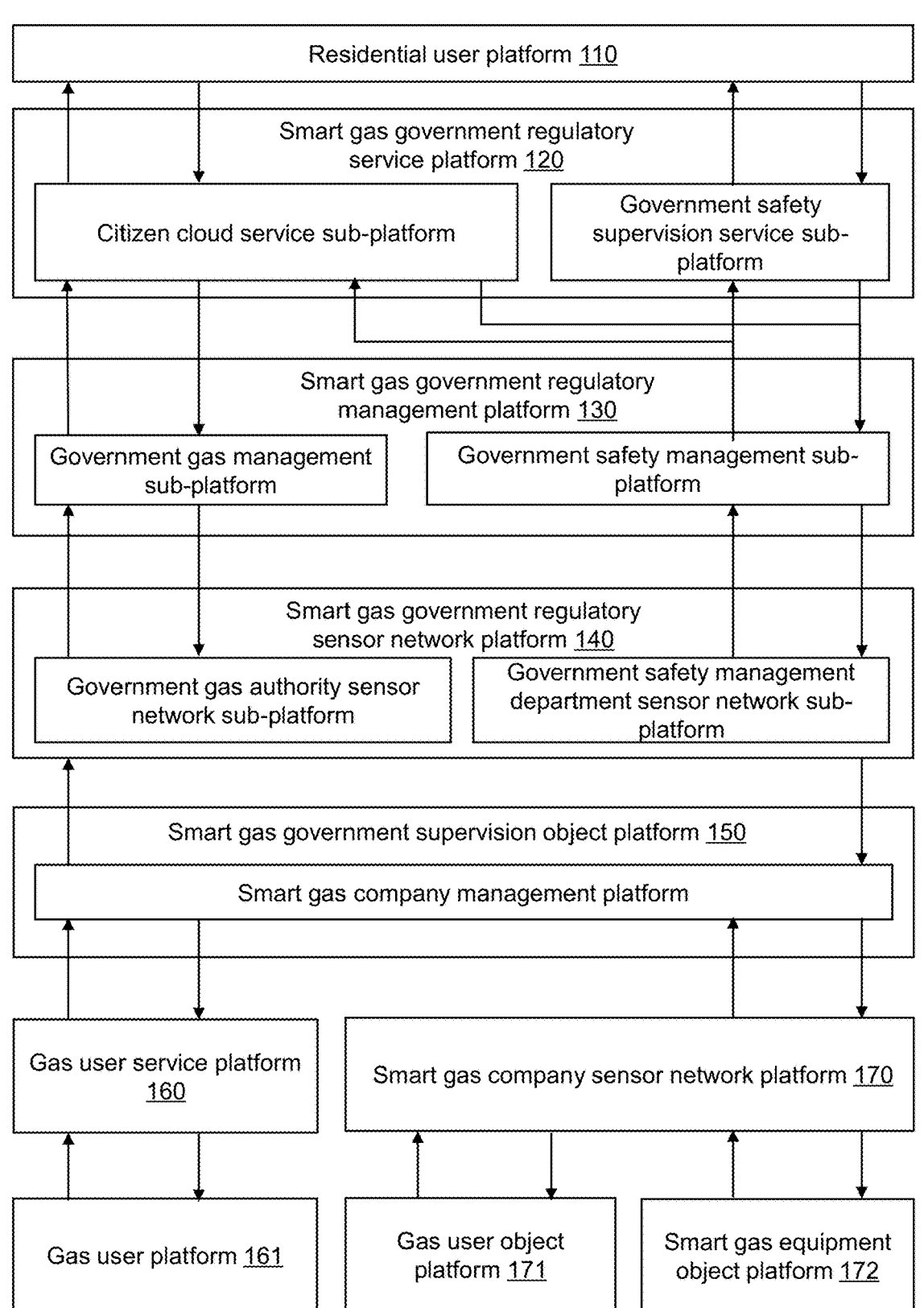
FIG. 1 is a schematic diagram illustrating an exemplary platform for an Internet of Things (IOT) system for government gas regulation according to some embodiments of the present disclosure.

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

It will be understood that the terms "system," "engine," "unit," "module," and/or "block" used herein are one method to distinguish different components, elements, parts, sections, or assemblies of different levels in ascending order. However, the terms may be displaced by other expressions if they may achieve the same purpose.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

FIG. 1 is a schematic diagram illustrating an exemplary platform for an Internet of Things (IOT) system for government gas regulation according to some embodiments of the present disclosure.

In some embodiments, the Internet of Things (IOT) system for government gas regulation 100 may include a residential user platform 110, a smart gas government regulatory service platform 120, a smart gas government regulatory management platform 130, a smart gas government regulatory sensor network platform 140, a gas user service platform 160, a gas user platform 161, a smart gas government supervision object platform 150, a smart gas company sensor network platform 170, a gas user object platform 171, and a smart gas equipment object platform 172.

The residential user platform 110 is a platform for the government to provide services to residential users. In some embodiments, the residential user platform may share data with the gas user platform based on the target gas data.

In some embodiments, the residential user platform 110 may interact with the smart gas government regulatory service platform. For example, the residential user platform may send a data sharing request to the smart gas government regulatory service platform and receive the target gas data from a data switch. More descriptions of the target gas data and the data switch may be found in FIG. 2 and the related descriptions.

The smart gas government regulatory service platform 120 is a platform for providing information related to gas operation regulatory services. In some embodiments, the smart gas government regulatory service platform may interact with the residential user platform 110 and the smart gas government regulatory management platform 130 for data exchange.

In some embodiments, the smart gas government regulatory service platform 120 includes a citizen cloud service sub-platform and a government safety supervision service sub-platform. The citizen cloud service sub-platform may be used to provide gas-related citizen services to the user, and the government safety supervision service sub-platform may be used to provide gas-related safety services to the user. In some embodiments, the smart gas government regulatory service platform 120 may include multiple groups of routers, and the multiple groups of routers may be deployed in the citizen cloud service sub-platform and the government safety supervision service sub-platform.

Different routers may interface with data from different users, and the routers may be configured to prioritize data sharing according to the request time of the data sharing request and the router core degree, determine a data sharing priority, and send the data sharing priority with the data sharing request to the smart gas government regulatory management platform.

Figure 5:
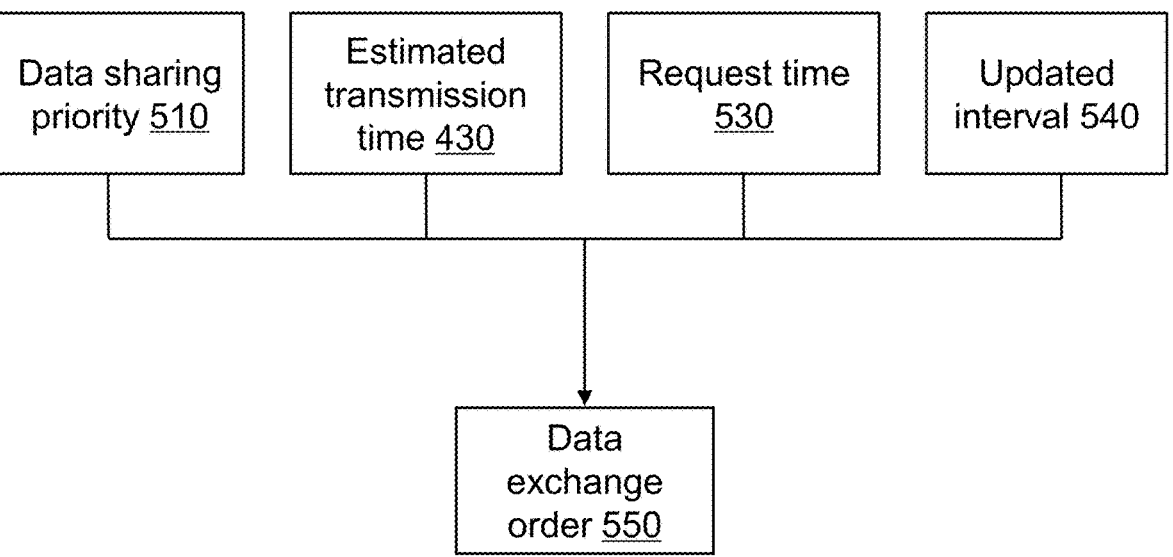
FIG. 5 is a schematic diagram illustrating an exemplary data exchange order influencing factors according to some embodiments of the present disclosure.

More descriptions of the router core degree and determining the data sharing priority may be found in FIG. 2 and FIG. 5 and the related descriptions.

The smart gas government regulatory management platform 130 is a comprehensive management platform for the government to manage gas-related information. In some embodiments, the smart gas government regulatory management platform may include a government gas management sub-platform and a government safety management sub-platform. The government gas management sub-platform may interact with the citizen cloud service sub-platform and the government gas authority sensor network sub-platform for data exchange; and the government safety management sub-platform may interact with the government safety supervision service sub-platform and the government safety management department sensor network sub-platform for data exchange.

In some embodiments, the smart gas government regulatory management platform 130 may be provided with a gas-integrated data center and a data switch. The gas-integrated data center is a storage center for storing gas-related information, and the gas-integrated data center may include multiple gas databases. More descriptions of the data sharing priority, data exchange order, and data transmission bandwidth may be found in FIG. 2 and the related instructions.

The data switch is a network device used for relaying and transmitting data information. In some embodiments, different ports of the data switch correspond to different routers.

The smart gas government regulatory sensor network platform 140 is a functional platform for the government to manage the sensing communications, and may realize functions of sensing communications for sensing information and sensing communications for controlling information. In some embodiments, the smart gas government regulatory sensor network platform may include a government gas authority sensor network sub-platform and a government safety management department sensor network sub-platform.

In some embodiments, the smart gas government regulatory sensor network platform 140 may interact with the smart gas government regulatory management platform 130 and the smart gas government supervision object platform 150 for data exchange.

The gas user platform 161 is a platform for a gas company to provide services to a gas user. The gas user may include a gas enterprise user and a gas residential user. In some embodiments, the residential user platform may share data with the gas user platform based on target gas data.

In some embodiments, the gas user platform 161 may interact with the smart gas government supervision object platform 150. For example, the gas user platform may send the data sharing request to the smart gas government regulatory service platform 120 and receive target gas data.

The gas user service platform 160 is a platform for communicating information requirements and controls of the gas user. In some embodiments, the gas user service platform 160 may include multiple groups of routers.

In some embodiments, the gas user service platform 160 may interact with the gas user platform 161 and the smart gas government supervision object platform 150 for data exchange.

The smart gas government supervision object platform 150 may be a functional platform for information generation for perceived gas enterprise supervision. In some embodiments, the smart gas government supervision object platform includes a smart gas company management platform, and the smart gas company management platform may access comprehensive gas enterprise data. More description of the comprehensive gas enterprise data may be found in FIG. 2 and the related descriptions.

The smart gas company sensor network platform 170 may be a functional platform for a gas company to manage sensor communication.

In some embodiments, the smart gas company sensor network platform 170 may communicate with the smart gas government supervision object platform 150 and the gas user object platform 171 and the smart gas equipment object platform 172 configured by different companies, respectively, for communication connection.

The gas user object platform 171 may be a functional platform used to sense the generation of information related to gas usage. In some embodiments, the gas user object platform 171 may be configured on an enterprise communication terminal. The enterprise communication terminal is a device or software used to send, receive, and process information in a communication network of an enterprise, and may include cell phones, landlines, and industrial internet of things terminals.

The smart gas equipment object platform 172 may be a functional platform for generating information about sensing gas-related equipment.

In some embodiments, the smart gas equipment object platform 172 may be configured on a gas monitoring device included in the gas production facilities. The gas production facilities denote equipment that requires the use of gas for production operations, such as smelting furnaces that use gas as fuel, and chemical equipment that uses gas as a raw material. The gas monitoring devices pertain to monitoring devices used to detect operating status of gas production facilities and ensure gas safety, such as gas flow meters, gas leak detectors, or the like.

In some embodiments of the present disclosure, based on the Internet of Things (IOT) system for government gas regulation 100, an information operation closed loop may be formed between the residential user platform and the gas user platform, and coordinated under the unified management of the smart gas government regulatory management platform 130 and regular operation, realizing the informatization and intellectualization of the gas regulatory Internet of Things management.

FIG. 2 is a flowchart of an exemplary process for managing a smart gas-integrated data center according to some embodiments of the present disclosure. As shown in FIG. 2, the process 200 includes the following operations. In some embodiments, the process 200 may be performed by the smart gas government regulatory management platform 130.

In 210, comprehensive gas enterprise data may be obtained through a smart gas company management platform.

The comprehensive gas enterprise data refers to data related to regulation of gas enterprises. The gas enterprise refers to enterprises, units, and organizations that consume gas.

In some embodiments, the smart gas government regulatory management platform may obtain, from the smart gas government regulatory sensor network platform, the smart gas government supervision object platform, and the smart gas company sensor network platform, respectively, communication data of the relevant personnel of the gas enterprise from the gas user object platform corresponding to the gas enterprise; and the relevant data of the production equipment of the gas enterprise from the smart gas equipment object platform. The obtained communication data and the related data are determined to be comprehensive gas enterprise data.

In some embodiments, the smart gas government regulatory management platform may also obtain enterprise interaction data from the enterprise communication terminal and gas monitoring data from the gas monitoring device. The obtained enterprise interaction data and the gas monitoring data are determined to be comprehensive gas enterprise data. The enterprise interaction data may include safety logs, results of routine inspections, or the like, of the gas company; the gas monitoring data may include gas equipment operation data, gas sensor monitoring data, or the like. The gas user object platform is configured on the enterprise communication terminal, and the smart gas equipment object platform is configured on the gas monitoring device included in the gas production facilities.

In 220, a tagging parameter is generated based on the comprehensive gas enterprise data.

The tagging parameter is a parameter that is categorized and assigned a tag based on a type or feature of the comprehensive gas enterprise data. In some embodiments, different tags correspond to different gas databases, and the smart gas government regulatory management platform may store the comprehensive gas enterprise data into the corresponding gas database based on the tags corresponding to the comprehensive gas enterprise data.

Exemplarily, the tagging parameters may include a type tag (e.g., monitoring data, inspection data, equipment operating parameter data, and fault alarm data, etc.), a timeliness tag, and an importance grading tag. In some embodiments, the timeliness tag may be indicated by an effective date corresponding to the data, and the timeliness tag may also be indicated by a countdown to expiration; the importance grading tag may be indicated by a numerical value ranging from 1-10. The larger the value, the more important the corresponding comprehensive gas enterprise data.

In some embodiments, the smart gas government regulatory management platform may establish a first preset table based on the historical type, historical source, and historical tagging parameters of the historical comprehensive gas enterprise data. The first preset table includes correspondences between the historical types, historical sources, and different historical tagging parameters. The smart gas government regulatory management platform may determine a current tagging parameter based on a type and source of the current comprehensive gas enterprise data by consulting the first preset table.

In some embodiments of the present disclosure, the smart gas government regulatory management platform may also determine the tagging parameter in other ways. For example, the timeliness tag is determined based on a validity period of the comprehensive gas enterprise data, and the importance grading tag is determined based on a scoring of an importance of the comprehensive gas enterprise data. The validity period and the importance of the comprehensive gas enterprise data may be obtained based on obtaining manual input or default settings.

In 230, target gas data is generated based on the comprehensive gas enterprise data and the tagging parameter.

The target gas data is comprehensive gas enterprise data with tags. In some embodiments of the present disclosure, the smart gas government regulatory management platform may tag the comprehensive gas enterprise data based on the tagging parameter, and the obtained comprehensive gas enterprise data with the tagging is determined as the target gas data.

In 240, the target gas data may be stored into a corresponding gas database.

The gas database is a database for collecting, storing, and managing gas-related information. In some embodiments, the gas database may include a basic information database of a gas industry, an operational database, a specialized database, a supervisory database, and a shared database.

The basic information database of the gas industry stores basic information and statistical data related to the gas industry as a whole, such as relevant standards and specifications, industry reports, and the distribution of gas consumption, or the like; the operational database stores data related to operation of gas-related equipment, such as gas transmission pressure, flow rate, temperature, or the like; the specialized database stores data in specific fields or aspects, such as gas technical data, gas maintenance data, or the like; the supervisory database is used to store laws, regulations, and standard requirements for various types of regulated gas enterprises, such as compliance information, audit reports, or the like; the shared database is used to store gas-related data exchanged and shared across departments, enterprises and regions, such as public service information and enterprise transaction information.

In 250, in response to receiving a data sharing request, the target gas data may be retrieved from at least one of the gas database through a data switch based on a data sharing priority and the estimated transmission time.

The data sharing request is a request for notification information about relevant target gas data. In some embodiments of the present disclosure, the data sharing request may be sent by the user consuming the gas through the corresponding gas user platform and residential user platform. Exemplarily, the data sharing request may be: obtaining information such as distribution of gas consumption and gas usage of a certain type of gas enterprise.

In some embodiments of the present disclosure, the data sharing request may also be updated based on an updating cycle tag. More descriptions of updating cycle tags and how updates are performed may be found in the related description below.

The data sharing priority may reflect a level of prioritization of data sharing requests. In some embodiments of the present disclosure, the data sharing priority may be expressed by a numerical value or a rank, with a larger value indicating that the current data sharing request is more urgent and needs to be prioritized.

In some embodiments, the smart gas government regulatory management platform may determine data sharing priority through various processes. For example, the data sharing priority may be positively correlated to an interval between a data sharing request initiation time and the current time and a router core degree.

The router core degree reflects the priority level and importance of the router in the IoT system, and the router core degree may be expressed by a numerical value or a rank, e.g., the larger the value, the more important the current router is.

In some embodiments of the present disclosure, the router core degree correlates to a transfer data volume of the router and a deployment location of the router. For example, the router core degree may be positively correlated to a location level of the router in the IoT system and the transfer data volume. For example, the router location level may reflect an importance of the router in the IoT system, and the router location level is negatively correlated to a hop count of the router.

The hop count of the router indicates a count of routers or intermediate nodes that need to be passed during the halfway through a process of transmitting data from the database to the transport router. Exemplarily, a hop count of a router that sends data that needs to pass through two routers, and a switch, and transit three times before it reaches the database is 3.

In some embodiments of the present disclosure, the smart gas government regulatory management platform may determine the router core degree by formula (1):

$$Y = L \times \delta + \frac{k_1}{T} \times \mu \qquad (1)$$

Y denotes the router core degree, L denotes the transfer data volume, T denotes the hop count of the router, $k_1$ is a preset coefficient, and δ and μ denote a transit weight and a location weight, respectively, and values of the transit weight δ and location weight μ may be preset based on a priori experience.

In some embodiments, since different gas enterprises have varying levels of gas consumption, a gas enterprise with higher consumption has stricter requirements for gas-related data. Therefore, the location weight is also related to the gas consumption scale of the gas enterprise. For example, the larger the gas consumption scale of the gas enterprise, the larger the location weight of its corresponding router.

In some embodiments, there is a difference in the level of importance, as different routers interface with different types of gas users, and therefore different transactions are handled by the routers. Determining the data sharing priority through the router core degree ensures that the routers with high priority are prioritized during data transmission.

In some embodiments, the smart gas government regulatory management platform may determine the data sharing priority through formula (2):

$$S = k_2 \times A + k_3 \times Y \qquad (2)$$

S denotes the data sharing priority, A denotes the interval between the data sharing request initiation time and the current time, Y denotes the router core degree, and $k_2$ and $k_3$ are preset coefficients, $k_2$ and $k_3$ are non-negative and a sum of $k_2$ and $k_3$ is 1.

The estimated transmission time is an estimated elapsed time for transmitting target gas data corresponding to a particular data sharing request.

In some embodiments, the estimated transmission time may be positively correlated to the amount of data and database retrieval time of the target gas data corresponding to the data sharing request, and negatively correlated to the data transmission bandwidth of the interface corresponding to the transmitted data. Exemplarily, the larger the amount of data of the target gas data corresponding to the data sharing request, the longer the database retrieval time, and the smaller the data transmission bandwidth, the longer the estimated transmission time. The database retrieval time is a time spent by the database to perform data retrieval matching when fetching the target gas data corresponding to the data sharing request, which may be obtained based on the log data of the database, or it may be an average value for the database's historical retrieval elapsed time average.

In some embodiments, the smart gas government regulatory management platform may determine the estimated transmission time by formula (3):

$$T = \frac{C}{D} + E \qquad (3)$$

T denotes the estimated transmission time, C denotes the amount of data of the target gas data corresponding to the data sharing request, D denotes the data transmission bandwidth of the interface corresponding to the transmitted data, and E denotes the database retrieval time of the target gas data corresponding to the data sharing request. The data transmission bandwidth D may be the historical data transmission bandwidth average of the interface corresponding to the transferred data.

In some embodiments, the estimated transmission time may be a numerical value and may also be a range.

In some embodiments, the smart gas government regulatory management platform may determine, based on the data sharing request, the gas database where the target gas data to be retrieved is located, and from the corresponding gas database, retrieve the target gas data.

In some embodiments, the smart gas government regulatory management platform may establish a second preset table based on the historical data sharing request, the historical estimated transmission time, and the historical target gas data. The second preset table includes correspondences among the historical data sharing request, the historical estimated transmission time, and different historical target gas data. The smart gas government regulatory management platform may determine the current target gas data based on the current data sharing request and the estimated transmission time by consulting the second preset table.

In 260, the target gas data satisfying a preset requirement is sent to a gas user platform or a residential user platform to enable the gas user platform and the residential user platform to share data based on the target gas data.

The preset requirement is a judgment condition that allows a data transmission to occur. In some embodiments, the preset requirement may include, but are not limited to, the timeliness tag of the target gas data being marked as within the validity period and the type tag of the target gas data being marked as monitoring data, or the like.

In some embodiments, the preset requirement may further include that the data validity of the target gas data meets a predetermined criteria; the data validity may be based on a redundancy level of the comprehensive gas enterprise data uploaded by the gas user object platform and the smart gas equipment object platform. More on the data validity, the predetermined criteria, and the degree of redundancy level may be found in FIG. 4 and the related descriptions.

According to some embodiments of the present disclosure, by tagging and storing comprehensive gas enterprise data, it is possible to select the most appropriate target gas data based on the tagging when data sharing is required and to carry out the data sharing, thereby ensuring the timeliness and the data validity of the shared data and improving the quality of the data sharing.

At the same time, if there are other objects that need to share data, the information acquisition end corresponding to the objects that need to participate in the sharing may also be configured into the current system as a special type of gas user platform, thus realizing information sharing at minimal cost without changing the operating rules of the existing system.

In some embodiments, the tagging parameter includes: generating an updating cycle tag. In some embodiments, the smart gas government regulatory management platform may also generate an updating cycle tag to determine, based on the updating cycle tag, a data exchange cycle for the gas user object platform and the smart gas equipment object platform configured by different gas companies; based on the smart gas company management platform, adjusting the operating parameters of the enterprise communication terminal corresponding to the gas user object platform and the gas monitoring device corresponding to the smart gas equipment object platform based on the data exchange cycle.

The updating cycle tag is a tag that is associated with a target gas data updating cycle. In some embodiments, the updating cycle tag may reflect an updating cycle for the target gas data in a future time period.

In some embodiments, the smart gas government regulatory management platform may determine the updating cycle tag in multiple ways. Exemplarily, the smart gas government regulatory management platform may determine the updating cycle tag based on a type tag of the target gas data by vector retrieval.

For example, the smart gas government regulatory management platform may construct a vector to be matched with at least a type tag of the target gas data as an element. The smart gas government regulatory management platform may conduct a search in the vector database based on the vector to be matched, obtain reference vectors whose vector distances from the vector to be matched are less than a distance threshold, determine the historical updating cycle tag corresponding to the reference vector as the current required updating cycle tag.

The vector database stores a number of reference vectors and the corresponding historical updating cycle tags. The reference vectors are constructed based on historical type tags. The vector database may be pre-constructed based on historical data or prior knowledge.

In some embodiments, the smart gas government regulatory management platform may determine an updating cycle based on a cycle model. More descriptions of determining the updating cycle based on the cycle model may be found in FIG. 3 and the related descriptions.

The data exchange cycle refers to a cycle of data exchange between gas user object platform and the smart gas equipment object platform. In some embodiments, the data exchange cycle may include a data collection cycle and a data upload cycle, or the like. The data exchange cycle may be the same or different for different platforms.

In some embodiments, the smart gas government regulatory management platform may determine a data exchange cycle by vector retrieval based on the updating cycle and the type tag of the target gas data.

For example, the smart gas government regulatory management platform may construct a vector to be matched with at least the updating cycle of the target gas data and the type tags as elements. The smart gas government regulatory management platform may conduct a search in the vector database based on the vector to be matched to obtain a reference vector that have a minimum distance or less than a distance threshold from the vectors of the vector to be matched, and set a historical data exchange cycle corresponding to the reference vector to determine a current data exchange cycle.

The vector database stores a number of reference vectors and the corresponding historical data exchange cycles. The reference vectors are constructed based on the historical updating cycles and historical type tags. The vector database may be pre-built based on historical data or prior knowledge.

The operating parameter is a parameter for operating, regulating, and controlling an operation process of an enterprise communication terminal corresponding to the gas user object platform and a gas monitoring device corresponding to the smart gas equipment object platform. In some embodiments, the operating parameter may include a data acquisition frequency and a data transmission frequency, or the like.

In some embodiments, the smart gas government regulatory management platform may determine a data acquisition frequency and a data transmission frequency corresponding to different platforms based on a required data exchange cycle, and determine the data acquisition frequency and the data transmission frequency corresponding to different platforms as operating parameters. For example, the smart gas government regulatory management platform may retrieve a parameter comparison table based on the data exchange cycle to determine the data acquisition frequency and the data transmission frequency corresponding to the different platforms. The parameter comparison table stores different data exchange cycles, different platforms, and the data acquisition frequency and the data transmission frequency in relation to each other based on statistics of the historical data.

In some embodiments of the present disclosure, by determining a data exchange cycle by the updating cycle tag and further adjusting the operating parameters of the enterprise communication terminal corresponding to the gas user object platform and the gas monitoring device corresponding to the smart gas equipment object platform, the authenticity and timeliness of the information stored in the database can be ensured.

In some embodiments, the data switch may also determine a data exchange order for target gas data based on the data sharing priority, and adjust data transmission bandwidths of different ports based on the data exchange order.

The data exchange order refers to an order in which the target gas data is sorted for transmission. In some embodiments, the data exchange order also includes an order in which the target gas data is converted to a data form, such as converting the target gas data in the form of a digital signal to an analog signal.

In some embodiments, the data exchange order of the target gas data may be positively correlated to the data sharing priority, e.g., the higher the data sharing priority, the higher the data exchange order.

In some embodiments, the smart gas government regulatory management platform may determine the data exchange order in multiple ways. Exemplarily, the smart gas government regulatory management platform may sort the target gas data based on the data sharing priority in descending order, and when there exists a plurality of target gas data with the same data sharing priority, the data is sorted according to the value of the importance grading. The smart gas government regulatory management platform may determine the order obtained from the sorting as the required data exchange order.

In some embodiments, the data switch may determine, based on the current data transmission bandwidth, the estimated transmission times of different target gas data; based on the sorting of the data exchange order, select a preset quantity of target gas data with a higher sorting order, and determine the target gas data whose estimated transmission time is greater than a timeout threshold as the target gas data to be adjusted, and adjust a data transmission bandwidth of a port corresponding to the target gas data to be adjusted.

The preset quantity may be determined based on the data sharing priority of the target gas data, for example, the preset quantity may be a number of target gas data whose data sharing priority is greater than or equal to the preset priority; and the process of adjusting the data transmission bandwidth may include increasing the bandwidth.

For example, data sharing priorities of the top 5 data in terms of data exchange order are (Sequence 1:96, Sequence 2:70, Sequence 3:41, Sequence 4:80, Sequence 5:90), the data of sequence 1 may be selected, an average value of its data sharing priority is 96, which is greater than a preset priority of 70, then continue to select the data of sequence 2, an average value of the two groups of data sharing priority is 83, which is still greater than the preset priority 70, then continue to select the data of sequence 3, an average value of the three groups of data sharing priority average value is 69, which is less than the preset priority 70, then the quantity to be adjusted may be set to 2, no longer considering the data of sequence 3 and beyond.

In some embodiments, the adjustment range of the data transmission bandwidth may be positively correlated to the amount of data corresponding to the target gas data of the data sharing request and the estimated transmission time.

For example, the smart gas government regulatory management platform may determine the adjustment range of the data transmission bandwidth based on the formula (4):

$$\psi = T \times \delta + C \times \gamma \qquad (4)$$

$\psi$ denotes the adjustment range of the data transmission bandwidth, C denotes the data volume of the target gas data corresponding to the data sharing request, T denotes the estimated transmission time, $\delta$ is the time weight, and $\gamma$ is the data volume weight. When the data volume is greater than the preset base data volume, the data volume weight $\gamma$ is $1-EXP^-$(current data volume–preset base data volume); when the data volume is less than or equal to the preset base data volume, at this time, the effect of the data volume on the adjustment range of the data transmission bandwidth may be ignored, and the data volume weight $\gamma$ is 0.

In some embodiments of the present disclosure, by determining whether the estimated transmission time of target gas data is overrun, and by performing bandwidth regulation based on the priority thereof, the bandwidth resources can be prioritized for allocation to high-priority target gas data, thereby ensuring that critical or urgent target gas data can be prioritized to be transmitted when the network is congested, thereby utilizing the network bandwidth resources more efficiently.

Figure 3:
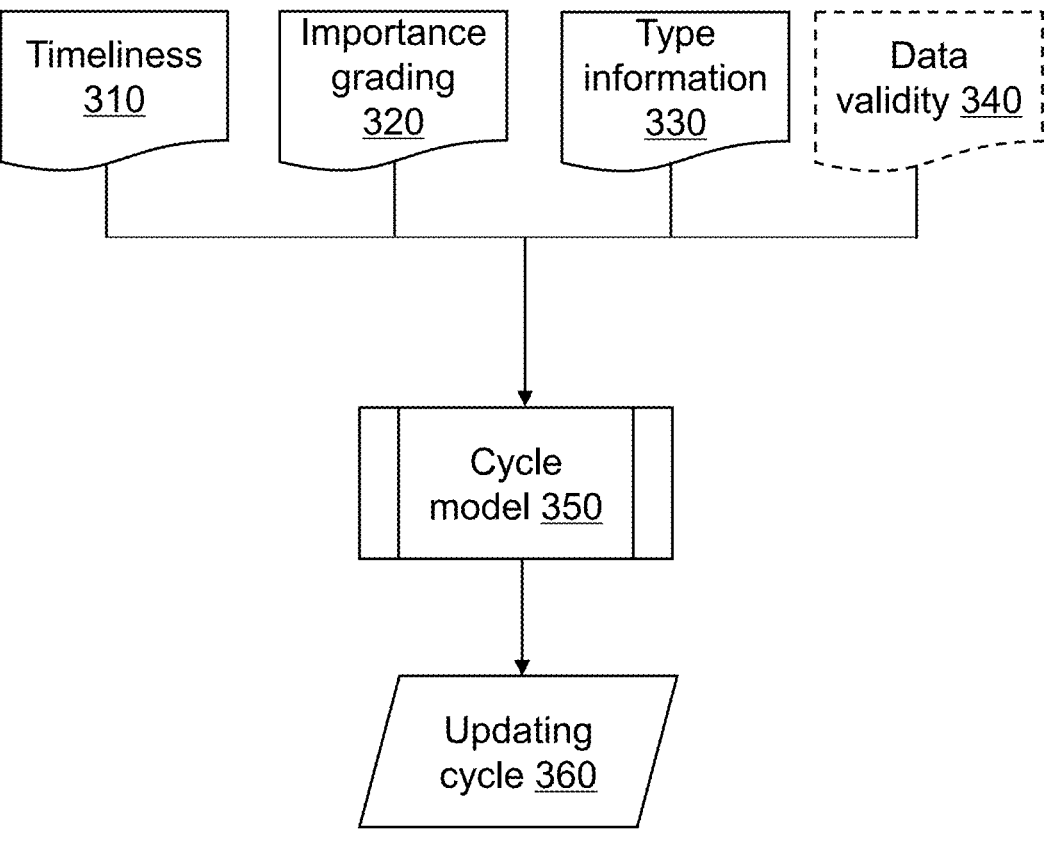
FIG. 3 is a schematic diagram illustrating an exemplary cycle model according to some embodiments of the present disclosure.

In some embodiments, the updating cycle may also be determined based on a cycle model 350. FIG. 3 is a schematic diagram illustrating an exemplary cycle model according to some embodiments of the present disclosure.

The cycle model 350 may be a model for determining an updating cycle. In some embodiments, the cycle model is a machine learning model. For example, the cycle model may be a convolutional neural network model, or the like.

The cycle model 350 may determine an updating cycle 360 based on a timeliness 310, an importance grading 320, and type information 330 of the target gas data. The training data of the cycle model includes training samples and training labels, the training samples are obtained based on tagging parameters of the target gas data, and the training labels are determined based on feedback results received by the gas user platform and/or the residential user platform regarding the data sharing request.

In some embodiments, inputs of the cycle model include the timeliness 310, the importance grading 320, and the type information 330, and the output is an updating cycle 360.

The cycle model 350 may be obtained by training. In some embodiments, a first training sample for training the cycle model may include multiple sets of training data, each group of training sample may be acquired based on a tagging parameter of historical sample target gas data. The first training sample may include sample timeliness, sample importance grading, and sample type information for the sample target gas data.

In some embodiments, a first label includes a preferred updating cycle for the sample target gas data determined based on feedback results corresponding to the sample data sharing request. The feedback results may be categorized as a Case A or a Case B. The case A: after the gas user platform or the residential user platform receives the data, the feedback results consider that the data validity is relatively high under the corresponding sample updating cycle, such as a percentage of the count of feedback results that consider the validity to be high is greater than a validity threshold, at this time the label value is a sample updating cycle corresponding to the sample data sharing request; the case B: in the feedback results, after the gas user platform or the residential user platform receives the data, the feedback results consider that the data validity is relatively low, at this time the sample updating cycle corresponding to the sample data sharing request is considered to be not feasible, and the label value is a preset value, such as 0.

In some embodiments, the value of the validity threshold may be determined based on manual input or system defaults. In some embodiments, the value of the validity threshold may also be positively correlated to a router core degree of a historical router corresponding to the training data.

In some embodiments, the smart gas government regulatory management platform 130 may train the cycle model by various processes based on the first training sample and the first label. For example, the training may be based on a gradient descent process. For example, a plurality of first training samples with a first label may be input into an initial cycle model, a loss function is constructed from the first label and the results of the initial cycle model, and the parameters of the initial cycle model are iteratively updated based on the loss function. The model training is completed when the loss function of the initial cycle model satisfies a predetermined condition, and a trained cycle model is obtained. The preset conditions may be that the loss function converges, the number of iterations reaches a threshold, or the like.

In some embodiments of the present disclosure, by using the cycle model that allows an updating cycle to be dynamically determined based on specific characteristics of the target gas data and the target gas data to be updated, it is possible to ensure that the target gas data is always timely and valid and meets user needs, thereby saving bandwidth resources, avoiding data waste, and improving data management efficiency.

In some embodiments, the inputs of the cycle model 350 also include a data validity 340 of the target gas data. Then when training the cycle model, the first training sample further includes sample data validity of the sample target gas data. More descriptions of the data validity 340 may be found in FIG. 4 and the related descriptions.

In some embodiments of the present disclosure, by using the data validity as an input to the cycle model, it is possible to enable the model to more accurately evaluate and analyze the target gas data, thereby making the updating cycle of the output more reasonable, and helping to optimize the allocation of resources in the IoT system, reduce unnecessary data transmission, and improve transmission quality and efficiency.

In some embodiments, the smart gas government regulatory management platform 130 may also determine different training sets based on feedback results of data sharing requests corresponding to different router core degrees; and determine a training size of the training sets based on the router core degrees; based on the training sets of the different training sizes, alternately train the cycle model.

The training set is the training samples used to alternate training cycle models. In some embodiments, the training set may include multiple sets of training data, the composition of the training data is similar to that of the training data in the first training samples and the first label corresponding to the first training samples, which can be seen in the descriptions above.

The training size is an amount of training data contained in the training set used to alternate train the cycle model.

In some embodiments, the training size is positively correlated to the router core degree. The higher the router core degree, and the more important that router is, the more important the feedback results of the corresponding data sharing request are, and the higher the weight of the proportion of the training process, the larger the training size of the corresponding training set.

In some embodiments, the smart gas government regulatory management platform 130 may train an initial cycle model based on a preset training order using at least one training set alternatively.

For example, the smart gas government regulatory management platform 130 may train the cycle model alternately with training sets of different router core degrees and alternately with training sets of different training sizes. The preset training order may be based on manual presets. The process of using the at least one training set is similar to the process of training the cycle model using the first training sample, as may be seen in the related descriptions above.

In some embodiments of the present disclosure, determining the training size of a training set based on the router core degree and training the initial cycle model sequentially based on the training set can improve the training efficiency of the cycle model, which is conducive to enhancing the generalization ability and adaptability of the cycle model in facing different usage scenarios.

Figure 4:
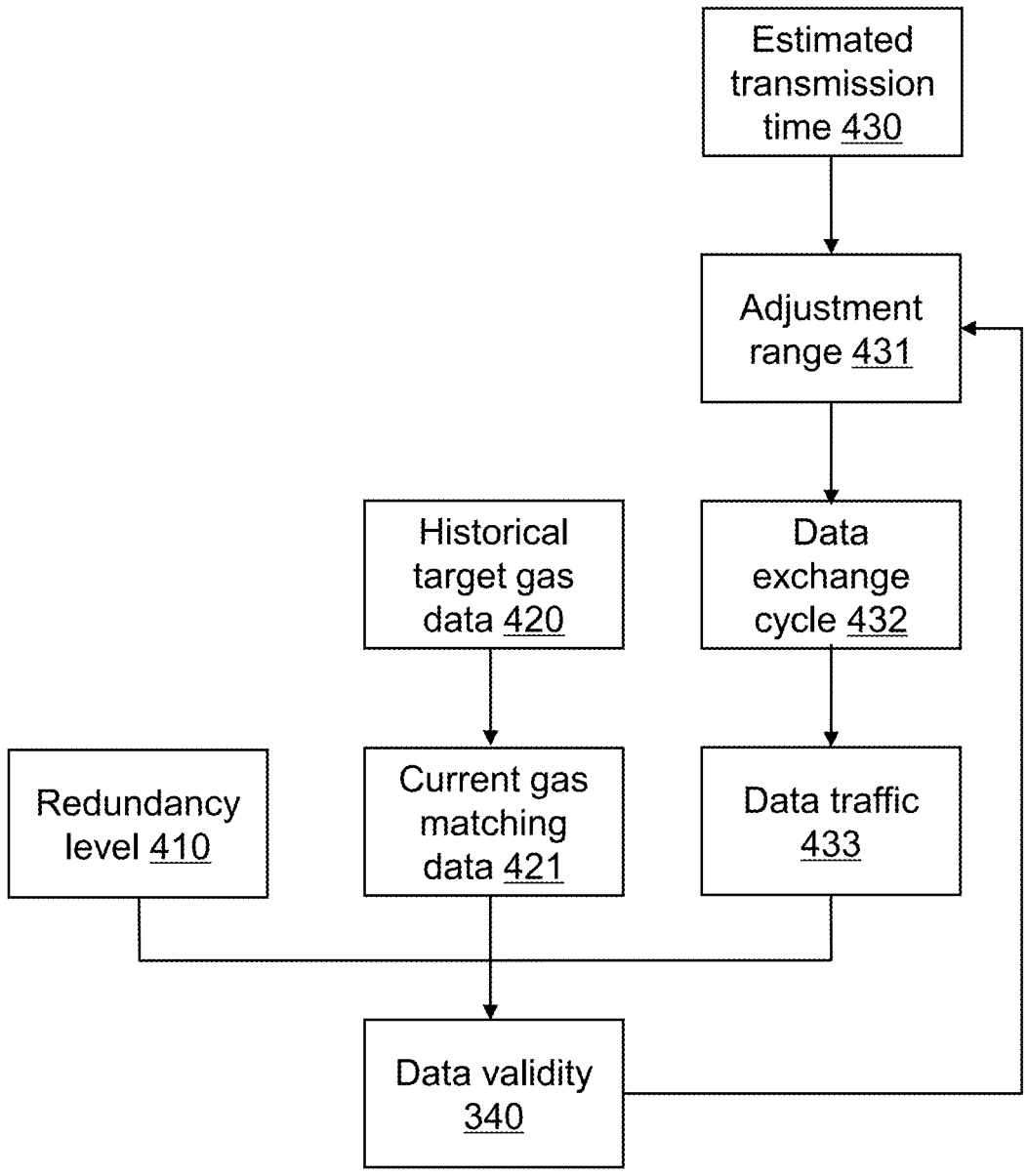
FIG. 4 is a schematic diagram illustrating an exemplary data validity influencing factors according to some embodiments of the present disclosure.

FIG. 4 is a schematic diagram illustrating an exemplary data validity influencing factor according to some embodiments of the present disclosure.

In some embodiments, the preset requirement includes that the data validity 340 of the target gas data meets the predetermined criteria. The data validity 340 is determined based on the redundancy level 411 of the comprehensive gas enterprise data uploaded by the gas user object platform 171 and the smart gas equipment object platform 172.

The data validity 340 may reflect the storage and transmission efficiency of the data, the lower the data validity, the more bloated the data is, the less efficient the data storage and transmission.

The predetermined criteria is a judgment condition for determining whether the data validity of the target gas data is qualified. In some embodiments, the predetermined criteria may be that the data validity of the target data is not less than a preset value. The predetermined value may be determined based on historical data or a priori experience.

The smart gas government regulatory management platform 130 may determine data validity in a variety of ways. In some embodiments, the data validity may be negatively correlated to a degree of redundancy level 411 of the data.

In some embodiments, the smart gas government regulatory management platform 130 may determine the data validity through formula (5) and formula (6):

$$F = \frac{k_4}{G} \quad (5)$$

$$G = \frac{H}{C} \quad (6)$$

F denotes the data validity, G denotes a redundancy level degree value, H denotes an amount of available data for the target gas data, C denotes an amount of data for the target gas data, and $k_4$ is a preset coefficient. The amount of available data H may be determined based on the feedback result corresponding to the target gas data; and the value of the preset coefficient $k_4$ may be determined based on a manual preset or a priori experience.

In some embodiments, the smart gas government regulatory management platform 130 may determine correspondences between the types of comprehensive gas enterprise data from different gas companies and the preset coefficient based on historical data statistics and then determine the value of the preset coefficient based on the type of current comprehensive gas enterprise data.

In some embodiments, the smart gas government regulatory management platform may also determine, based on the data exchange cycle 432, a data traffic 433; based on the historical target gas data 420, determine, by clustering, a target gas data that is closest to the current gas-matching data 421; and determining the data validity 340 based on the data traffic 433 and the gas-matching data 421.

The data traffic 433 is a total amount of data transmitted over a certain period time during the transmission of target gas data. In some embodiments, the data traffic may be positively correlated to the amount of data collecting and uploading, and negatively correlated to the data exchange cycle.

In some embodiments, the smart gas government regulatory management platform 130 may determine the data traffic by formula (7):

$$L = \frac{k_5 \times M_1 + k_6 \times M_2}{P} \quad (7)$$

L denotes the data traffic, P denotes the data exchange cycle, $M_1$ and $M_2$ denote the amount of data collection and an amount of uploading of data, respectively, and $k_5$ and $k_6$ are coefficients of the amount of data collection $M_1$ and the amount of data uploading $M_2$, respectively. The values of the coefficients $k_5$ and $k_6$ may be determined based on a manual preset or a priori experience.

The gas-matching data 421 is one or more groups of target gas data from the historical target gas data that meet requirement for matching with the current gas target data.

In some embodiments, the historical target gas data 420 may be represented by a historical data feature vector. Elements of the historical data feature vector may correspond to the historical target gas data. The historical data feature vector may be determined based on the historical target gas data in various ways.

In some embodiments, the elements in the historical data feature vector may correspond to tagging parameters of the historical target gas data. For example, the historical data feature vector may be (A, B, C, D), A-D represent the four types of elements included in the historical behavior feature vector, respectively. Exemplarily, A represents a type, B represents a timeliness, C represents an importance grading, and D represents an updating cycle. In some embodiments, a target data feature vector corresponding to the target gas data may also be constructed by constructing a historical data feature vector.

In some embodiments, the smart gas government regulatory management platform may determine a plurality of historical clustering collections by clustering feature vectors corresponding to each historical target gas data occurring by the user through a clustering algorithm. Each historical clustering collection includes one or more historical data feature vectors, and each historical clustering collection has a clustering center corresponding thereto.

The clustering algorithm may include a variety of types, for example, the clustering algorithm may include K-means clustering, density clustering algorithms may include various types, such as K-means clustering, density-based spatial clustering of applications with noise (DBSCAN), or the like.

In some embodiments, the smart gas government regulatory management platform 130 may calculate vector distances between clustering centers corresponding to different sets of historical clusters and the target data feature vector. The process for calculating the distances may include, but is not limited to, a Euclidean distance, a cosine distance, a Mars distance, a Chebyshev distance, and/or a Manhattan distance, or the like In some embodiments, the smart gas government regulatory management platform 130 may determine a collection of historical clusters that have the shortest vectorial distances from a current data feature vector, and identify historical target gas data corresponding to the collection as the desired gas-matching data.

In some embodiments, the data validity 340 may also be determined based on a discrepancy degree between the target gas data and the gas-matching data.

In some embodiments, the smart gas government regulatory management platform may determine the data validity by formula (8):

$$F = k_7 \times \frac{n \times \alpha \times L}{|R_1 - V| + |R_2 - V| + \ldots + |R_n - V|} \qquad (8)$$

F denotes the data validity, L denotes the data traffic, $R_n$ denotes the amount of data of the nth gas-matching data, V denotes the amount of data of the target gas data, n denotes the number of gas-matching data, and $|R_n - V|$ denotes the absolute value of the difference between the data amount of the nth gas-matching data and the data amount of the target gas data, $\alpha$ is the coefficient of the data traffic, and $k_7$ is the coefficient. The coefficient $\alpha$, and the value of the coefficient $k_7$ may be determined based on a manual predetermination or a priori experience.

In some embodiments of the present disclosure, the data validity is determined based on gas-matching data obtained from data traffic and clustering, which allows finding the gas-matching data most similar to the current data, and judging the validity of the current data based on the difference in data volume between the gas-matching data and the target gas data. It may effectively improve the precision of determining the data validity, and ensure the reasonableness and reliability of the results.

In some embodiments, in response to determining that the data validity 340 does not satisfy the predetermined criteria, the smart gas government regulatory management platform 130 may also adjust the gas user object platform 171 and data exchange cycle 432 of the smart gas equipment object platform 172; based on the adjusted data exchange cycle, the operating parameters of the enterprise communication terminal corresponding to the gas user object platform 171 and the gas monitoring device corresponding to the smart gas equipment object platform 172 are adjusted.

In some embodiments, the smart gas government regulatory management platform may also establish a third preset table based on historical target gas data corresponding to historical data validity, a historical validity threshold, and a historical data exchange cycle.

The third preset table includes correspondences among historical data validity, historical validity thresholds, and different historical data exchange cycles. The smart gas government regulatory management platform 130 may determine the corresponding data exchange cycle by consulting the third preset table based on the data validity of the current target gas data and the validity threshold, and adjust the actual data exchange cycle based on the difference between the obtained data exchange cycle and the actual data exchange cycle.

In some embodiments, an adjustment range 431 of the data exchange cycle may be positively correlated to the difference between the data exchange cycle and the actual data exchange cycle.

In some embodiments, the smart gas government regulatory management platform 130 may generate, based on the adjustment range 431 of the data exchange cycle, a corresponding operating parameter adjustment instruction and send the operating parameter adjustment instruction down to the enterprise communication terminal corresponding to the gas user object platform and the gas monitoring device corresponding to the smart gas equipment object platform to adjust the operating parameter.

In some embodiments of the present disclosure, when an excessive amount of data collection and data uploading occurs, the degree of data redundancy level may be elevated as well, resulting in a decrease in data validity; or even not meeting the data sharing requirement; furthermore, if the amount of the target gas data increases, the existing data collection cycle and data upload cycle may not be able to cope. At this time, the amount of redundant data may be appropriately reduced, and the burden of data transmission from the gas database and switches and routers may be reduced.

The present embodiment, by combining a variety of factors to adjust the data collection cycle and the data upload cycle, the data sharing efficiency of the gas-integrated data center can be ensured to satisfy the user's needs and experience.

In some embodiments, the adjustment range 431 of the data exchange cycle may also be correlated to the data validity 340 and the estimated transmission time 430 of the target gas data.

In some embodiments, the smart gas government regulatory management platform may determine an adjustment range of the data exchange cycle by formula (9):

$$S = k_8 \times \frac{(1 + |F - Z|) \times T}{U} \qquad (9)$$

S denotes the adjustment range of the data exchange cycle, F denotes the data validity, Z denotes the validity threshold, T denotes the estimated transmission time, U denotes the average value of the historical transmission time of the historical target gas data for which the data was considered valid in the user feedback, and $k_8$ is a coefficient. The value of the coefficient $k_8$ may be determined based on a manual predetermination or a priori experience; the historical transmission time average value U may be determined based on historical data.

In some embodiments of the present disclosure, when determining the adjustment range of the data exchange cycle, the data validity and the estimated transmission time are also considered, which can enhance the generalization capability and adaptability of the system, and even if data validity and the estimated transmission time are encountered data that is more abnormal, the data exchange cycle can be adjusted in a timely manner.

FIG. 5 is a schematic diagram illustrating an exemplary data exchange order influencing factor according to some embodiments of the present disclosure.

In some embodiments, the target gas data includes a data exchange order 550, and the data exchange order 550 is determined based on a data sharing priority and an estimated transmission time.

In some embodiments, the smart gas government regulatory management platform 130 may determine the data exchange order in multiple ways. For example, the smart gas government regulatory management platform may determine an initial data exchange order based on the data sharing priority 510, adjust the initial data exchange order based on the estimated transmission time 430 of different target gas data, and ultimately obtain a data exchange order 550. According to some embodiments of the present disclosure, the smart gas government regulatory management platform 130 may grade the target gas data based on whether the estimated transmission time of the different target gas data exceeds a time threshold, wherein different grades correspond to different order adjustment values. The initial data exchange order is adjusted based on the order adjustment values of different grades to obtain a desired data exchange order. The order adjustment value may reflect an adjustment range of the order, and the adjustment value of the order may be expressed as an integer. For example, +5 may indicate shifting the data exchange order of the target gas data forward by 5 places, and −2 may indicate shifting the data exchange order of the target gas data backward by 2 places; the correspondence between the grading and the order adjustment value may be determined based on manual inputs or historical data. More descriptions of the estimated transmission time may be found in FIG. 2 and related descriptions.

In some embodiments of the present disclosure, determining the data exchange order 550 based on the data sharing priority 510 and the estimated transmission time 430 allows for a comprehensive consideration of the impact of the amount of data and the transmission time on the data transmission process, ensuring that the data transmitted according to the data exchange order may not be affected in terms of timeliness due to excessive transmission time.

In some embodiments, the smart gas government regulatory management platform may also determine, based on a weighted processing of the data sharing priority 510, the estimated transmission time 430, the request time 530 for the data sharing request, and the updated interval 540, the data exchange order 550. More descriptions of the data sharing priority 510 and the estimated transmission time 430 may be found in FIG. 2 and the related descriptions.

The request time 530 of the data sharing request refers to an initiation time of data sharing request.

The updated interval 540 is a length of the updating cycle of the target gas data. In some embodiments, the updated interval may be determined based on historical data or manual input.

In some embodiments, if an updated interval of a certain target gas data is 24 hours, when the data sharing request is received near the time of data updating, the user may receive data that is less timeliness or invalid if the data transmission is performed in direct response to the data sharing request.

At this time, the smart gas government regulatory management platform may simultaneously send a confirmation notification to the user to confirm whether it is necessary to immediately receive the target gas data or appropriately delay the data sharing request to receive the updated target gas data. When the user selects to appropriately delay the data sharing request, the data exchange order may be appropriately adjusted to enable the user to receive the updated target gas data.

In some embodiments, the smart gas government regulatory management platform may determine data exchange order score corresponding to target gas data based on the weighted processing of the data sharing priority 510, the estimated transmission time 430, the request time 530 of the data sharing request, and the updated interval 540, sort the data exchange order score from the highest to the lowest, and determine the obtained order as a desired data exchange order 550.

In some embodiments, the smart gas government regulatory management platform may determine the data exchange order score of the data exchange cycle by formula (10):

$$J_n = \varepsilon_n \times \frac{S_n}{\overline{S}} - \epsilon_n \times \frac{T_n}{\overline{T}} + \zeta_n \times \frac{I_n}{\overline{I}} \qquad (10)$$

where $J_n$ denotes the data exchange order score of the nth target gas data, $\varepsilon_n$ denotes the data sharing priority of the nth target gas data, $T_n$ denotes the estimated transmission time of the nth target gas data, $I_n$ denotes the updated interval of the nth target gas data, $\overline{S}$ denotes a sum of the data sharing priority of all target gas data, $\overline{T}$ denotes a sum of the estimated transmission times of all target gas data, $\overline{I}$ denotes a sum of the updated interval of all target gas data, and $\varepsilon_n$, $\epsilon_n$, and $\zeta_n$ are coefficients of the data sharing priority, the estimated transmission times, and the updated interval corresponding to the nth target gas data, respectively. Values of the coefficients $\varepsilon_n$, $\epsilon_n$, and $\zeta_n$ may be determined based on manual predetermination or priori experience.

In some embodiments, the coefficient $\varepsilon_n$ and the coefficient $\epsilon_n$ have a negative correlation; the value of the coefficient $\varepsilon_n$ is positively correlated with the data validity of the nth target gas data; the value of the coefficient $\zeta_n$ is positively correlated with the updated interval $I_n$ of the nth target gas data.

In some embodiments of the present disclosure, determining the data exchange order 550 based on the weighted processing of the data sharing priority 510, the estimated transmission time 430, the request time 530 of the data sharing request, and the updated interval 540 can enable the user to receive the updated target gas data when approaching a point in time when the data is updated, thereby ensuring the timeliness of the target gas data to further improve the user experience.

It should be noted that the above descriptions are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting.

Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or collocation of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "unit," "platform," or "system." Furthermore, aspects of the present disclosure may take the form of a computer program product embodied in one or more computer readable media having computer-readable program code embodied thereon.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about," "approximately," or "substantially" in some examples. Unless otherwise stated, "about," "approximately," or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. An Internet of Things (IOT) system for government gas regulation, comprising: a residential user platform, a smart gas government regulatory service platform, a smart gas government regulatory management platform, a smart gas government regulatory sensor network platform, a gas user platform, a gas user service platform, a smart gas government supervision object platform, a smart gas company sensor network platform, a gas user object platform, a smart gas equipment object platform; wherein the residential user platform is configured to share data with the gas user platform based on target gas data;

the smart gas government regulatory service platform includes multiple groups of routers; the smart gas government regulatory service platform is configured to interact with the residential user platform and the smart gas government regulatory management platform for data exchange;

the smart gas government regulatory management platform is configured with a gas-integrated data center and a data switch; the gas integrated data center is configured with a plurality of gas databases; the data switch is configured to determine, based on a data sharing priority, a data exchange order of the target gas data, and adjust a data transmission bandwidth of each of different ports based on the data exchange order;

the smart gas government regulatory management platform is configured to:

generate a tagging parameter based on comprehensive gas enterprise data;

generate the target gas data based on the comprehensive gas enterprise data and the tagging parameter, and store the gas target data into the corresponding gas database, respectively;

in response to receiving a data sharing request from at least one of the residential user platform and the gas user platform, through the data switch, retrieving the gas target data from at least one of the gas database according to the data sharing priority and an estimated transmission time; and send the gas target data satisfying a preset requirement to at least one of the gas user platform and the residential user platform;

the smart gas government regulatory sensor network platform is configured to interact with the smart gas government regulatory management platform and the smart gas government supervision object platform for data exchange;

the gas user service platform includes multiple groups of routers; the gas user service platform is configured to interact with the gas user platform and the smart gas government supervision object platform for data exchange;

the smart gas government supervision object platform is configured to obtain the comprehensive gas enterprise data;

the smart gas company sensor network platform is configured to communicate and connect the smart gas government supervision object platform with the gas user object platform and the smart gas equipment object platform configured by different gas companies, respectively;

the gas user object platform is configured on an enterprise communication terminal;

the smart gas equipment object platform is configured on a gas monitoring device contained in gas production facilities; and for each group of the multiple groups of routers, the group of routers is configured to determine the data sharing priority based on a request time of the data sharing request and a router core degree, and send the data sharing priority and the data sharing request to the smart gas government regulatory management platform.

2. The system of claim 1, wherein the smart gas government regulatory service platform includes a citizen cloud service sub-platform, a government safety supervision service sub-platform, the multiple groups of routers deployed in the citizen cloud service sub-platform, the government safety supervision service sub-platform;

the smart gas government regulatory management platform includes a government gas management sub-platform and a governmental safety management sub-platform; the gas-integrated data center is deployed in the governmental safety management sub-platform;

the smart gas governmental regulatory sensor network platform includes a government gas authority sensor network sub-platform and a government safety management department sensor network sub-platform;

the government gas management sub-platform is configured to interact with the citizen cloud service sub-platform and the government gas authority sensor network sub-platform for data exchange; the governmental safety management sub-platform is configured to interact with the government safety supervision service sub-platform and the government safety management department sensor network sub-platform for data exchange; and the smart gas governmental supervision object platform includes a smart gas company management platform, the smart gas company management platform is configured to obtain the comprehensive gas enterprise data.

3. The system of claim 1, wherein for each group of the multiple groups of routers, the router core degree relates to a transfer data volume and a deployment location of the group of routers.

4. A method for managing a smart gas-integrated data center, the method being executed by a smart gas government regulatory management platform of an Internet of Things (IOT) system for government gas regulation, and the method comprising:

obtaining comprehensive gas enterprise data through a smart gas company management platform;

generating a tagging parameter based on the comprehensive gas enterprise data;

generating target gas data based on the comprehensive gas enterprise data and the tagging parameter;

storing the target gas data into a corresponding gas database, the gas database includes at least one of a basic information base, an operational database, a specialized database, a supervisory database, and a shared database;

in response to receiving a data sharing request, retrieving, from at least one of the gas database, the target gas data, through a data switch, based on a data sharing priority and the estimated transmission time; and sending the target gas data satisfying a preset requirement to a gas user platform or a residential user platform to enable the gas user platform and the residential user platform to share data based on the target gas data.

5. The method of claim 4, wherein the tagging parameter includes generating an updated cycle marker, the updated cycle marker reflecting an updating cycle of the target gas data in a future time period;

the method further comprises:

determining, based on the updated cycle marker, a data exchange cycle of a gas user object platform and a smart gas equipment object platform configured by the different gas companies; and adjusting, through the smart gas company management platform, operating parameters of an enterprise communication terminal corresponding to the gas user object platform and a gas monitoring device corresponding to the smart gas equipment object platform based on the data exchange cycle.

6. The method of claim 5, wherein the updating cycle being determined through a cycle model;

the cycle model is configured to determine the updated cycle based on timeliness, an importance grading, and type information of the target gas data; and the cycle model is a machine learning model, wherein training data of the cycle model includes training samples and training labels, the training samples are obtained based on the tagging parameter of the target gas data, the training labels are determined based on a feedback result of the data sharing request which is received by at least one of the gas user platform and the residential user platform.

7. The method of claim 6, wherein an input of the cycle model further includes data validity of the target gas data.

8. The method of claim 6, wherein the training of the cycle model includes:

determining different training sets based on feedback results of data sharing requests corresponding to different router core degrees;

determining different training sizes of the different training sets based on the different router core degrees, respectively; and alternating training the cycle model based on the different training sizes of the different training sets.

9. The method of claim 4, wherein the preset requirement includes the data validity of the target gas data satisfying a predetermined criteria; and the data validity is determined based on a redundancy level of the comprehensive gas enterprise data uploaded by a gas user object platform and a smart gas equipment object platform.

10. The method of claim 9, wherein determining the data validity includes:

determining a data traffic based on the data exchange cycle;

determining, by clustering, gas-matching data that is closest to current gas target data based on historical gas target data; and determining the data validity based on the data traffic and the gas-matching data.

11. The method of claim 9, wherein the method further includes:

in response to determining that the data validity does not satisfy the predetermined criteria, adjusting the data exchange cycle between the gas user object platform and the smart gas equipment object platform; and adjusting, based on the adjusted data exchange cycle, the operating parameters of the enterprise communication terminal corresponding to the gas user object platform and the gas monitoring device corresponding to the smart gas equipment object platform.

12. The method of claim 11, wherein an adjustment range of the data exchange cycle is related to the data validity and an estimated transmission time of the target gas data.

13. The method of claim 4, wherein the target gas data includes a data exchange order, the data exchange order is determined based on a data sharing priority and the estimated transmission time.

14. The method of claim 13, wherein the data exchange order being determined based on the data sharing priority and the estimated transmission time includes:

determining the data exchange order based on a weighted processing of the data sharing priority, the estimated transmission time, a request time of the data sharing request, and an updated interval of the data sharing request.

* * * * *